(No Model.) 2 Sheets—Sheet 1.

J. GRUBE.
SEED CLEANER.

No. 271,839. Patented Feb. 6, 1883.

Witnesses.
A. Ruppert
Geo. Byington

J. Grube
Inventor:
by his att'ys
Edson Bro's

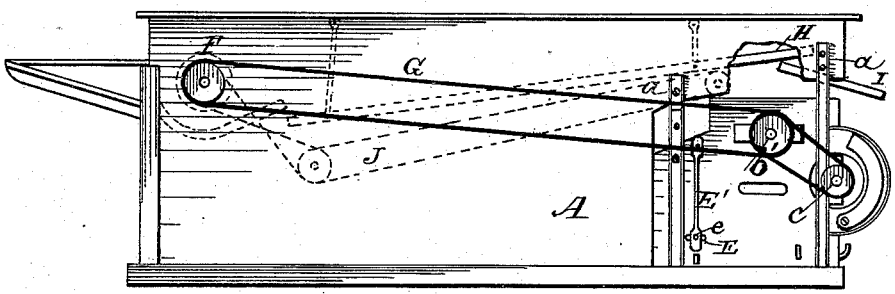

UNITED STATES PATENT OFFICE.

JEFFERSON GRUBE, OF AUBURN, INDIANA, ASSIGNOR TO THE NEWARK MACHINE COMPANY, OF NEWARK, OHIO.

SEED-CLEANER.

SPECIFICATION forming part of Letters Patent No. 271,839, dated February 6, 1883.

Application filed February 23, 1881. (No model.)

*To all whom it may concern:*

Be it known that I, JEFFERSON GRUBE, a citizen of the United States, residing at Auburn, in the county of De Kalb and State of Indiana, have invented certain new and useful Improvements in Seed-Cleaners; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to seed-cleaning attachments to thrashers and separators; and the novelty consists in the construction and arrangement of parts, as will be more fully hereinafter set forth, and specifically pointed out in the claims.

The device presented will be understood to receive and clean and separate the clover and grass seed, and is to be attached to a thrashing and cleaning device similar to that shown in the patent granted to me on the 7th day of December, 1880. It is attached to the side of such a machine, and by proper pulley-connections is operated by the same motive power, the feed of grass-seed from the former machine dropping into the hopper of the seed-cleaning device.

To enable others skilled in the art to which the invention relates to make and use the invention, I will describe the construction and mode of operation, reference being had to the accompanying drawings, which form a part of the specification, and in which—

Figure 1:
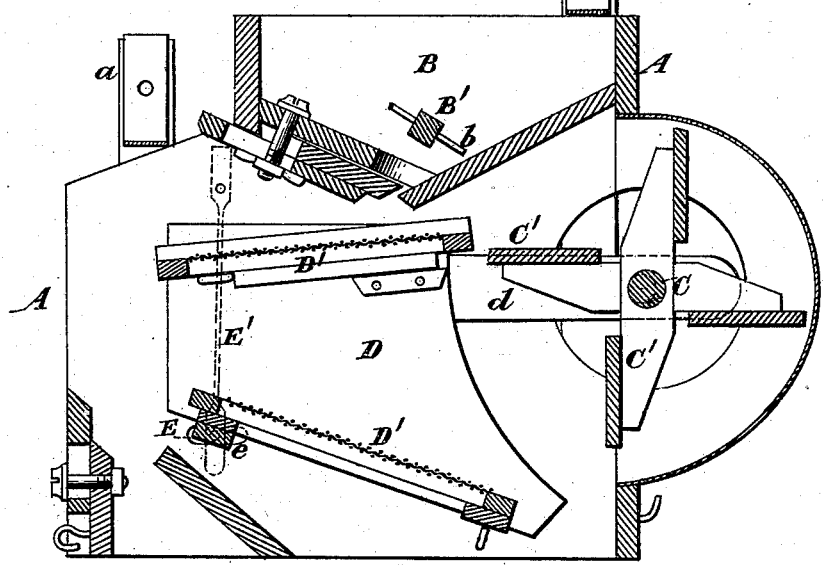
Figure 2:
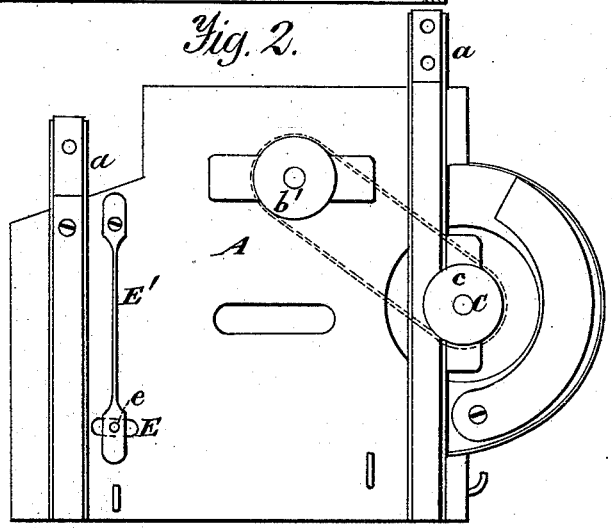
Figure 3:
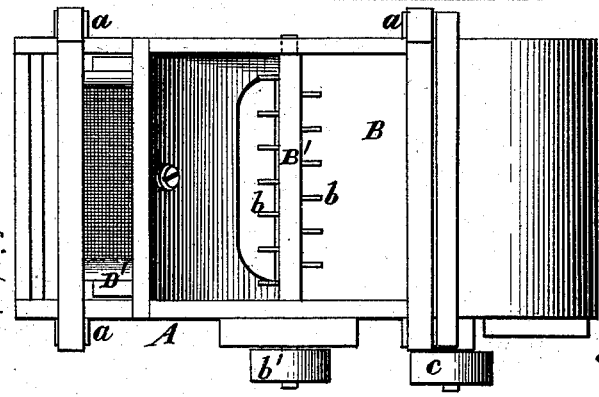

Figure 1 is a longitudinal vertical section, Fig. 2 a side elevation, and Fig. 3 a top plan view. Fig. 4 is a side elevation of a thrashing-machine and seed-cleaning machine combined and arranged in accordance with my invention.

Referring to the drawings, in which similar letters of reference indicate like parts in all the figures, A represents the frame of the device, having standards $a$, perforated for attachment to the thrasher and separator, as shown in Fig. 4.

B represents the hopper or receiver, into which the grass-seed fed from the separator is conducted by a suitable chute; and B', a transverse shaft having radial arms $b$ to agitate the seed and chaff. This shaft is connected by a pulley, $b'$, to a pulley, $c$, upon the fan or blower shaft C, carrying the fan C', and having an eccentric connection, $d$, with the vibrating shoe D, having screens D', as shown, arranged upon different inclines. A transverse arm, $e$, from each side of the shoe operates through slots E in the sides of the frame, and are secured to spring-arms E', secured above to the frame.

It will be understood that the grass-seed cleaner described is secured to a grain thrasher and separator, and by proper connections of belts and pulleys is operated by the same motive power.

Various modifications may be made in the minutiæ of construction without departing from the principle or sacrificing the advantages of the invention, the essential features of which consist in a seed-cleaning attachment for grain thrashers and separators operated by the same motive power, and adapted to receive the separated grass-seed, clean and separate the same by the means substantially as set forth. I deem the eccentric and spring motion given to the shoe as important.

Referring to Fig. 4, F represents the cylinder of any ordinary thrashing-machine, and from a pulley on the shaft of the cylinder a belt, G, extends to the pulley $b'$ of the cleaner to operate the same. I have also shown the straw-carrier and riddle H extending from the cylinder to the upper rear end of the machine where the straw is delivered from the same by chute I, while the grain which is separated from the straw falls upon an endless apron, J, located under the riddle, which apron delivers the grain into the hopper B of the cleaner in a manner readily apparent.

What I claim as new, and desire to secure by Letters Patent of the United States, is—

1. A seed-cleaning machine consisting of the frame A, having hopper B, agitating-shaft B' $b$, fan-shaft C, having eccentric connection $d$, the shoe D D', and the spring-arms E', as and for the purposes set forth.

2. The above-described seed-cleaner, in combination with and attached to the thrashing-machine, substantially as shown and described.

In testimony whereof I affix my signature in presence of two witnesses.

JEFFERSON GRUBE.

Witnesses:
C. KLOTZ,
ALBERT ROBBINS.